(12) United States Patent
Hirth et al.

(10) Patent No.: US 8,913,887 B2
(45) Date of Patent: Dec. 16, 2014

(54) PASSIVE OPTICAL FIBER PLANT ANALYSIS

(75) Inventors: Ryan E. Hirth, Windsor, CA (US);
Lowell D. Lamb, San Ramon, CA (US)

(73) Assignee: Broadcom Corporation, Irvine, CA (US)

( * ) Notice: Subject to any disclaimer, the term of this patent is extended or adjusted under 35 U.S.C. 154(b) by 204 days.

(21) Appl. No.: 13/483,944

(22) Filed: May 30, 2012

(65) Prior Publication Data

US 2013/0322869 A1 Dec. 5, 2013

(51) Int. Cl.
*H04B 10/08* (2006.01)

(52) U.S. Cl.
USPC ............... 398/16; 398/72; 398/100; 398/25; 398/21; 398/33; 398/17; 398/20; 398/10; 398/31; 398/38; 356/73.1

(58) Field of Classification Search
USPC .......... 398/16, 10, 13, 17, 20, 21, 25, 26, 27, 398/30, 31, 33, 38, 66, 68, 70, 71, 72, 79, 398/100, 98, 99, 135, 136; 356/73.1
See application file for complete search history.

(56) References Cited

U.S. PATENT DOCUMENTS

| | | | |
|---|---|---|---|
| 2006/0222364 A1* | 10/2006 | Chung et al. | 398/72 |
| 2009/0080880 A1* | 3/2009 | Lee et al. | 398/14 |
| 2010/0111523 A1* | 5/2010 | Hirth et al. | 398/25 |
| 2011/0211827 A1 | 9/2011 | Soto et al. | |

FOREIGN PATENT DOCUMENTS

| | | |
|---|---|---|
| EP | 2 451 123 A1 | 5/2012 |
| IE | 2 141 832 A1 | 1/2010 |

OTHER PUBLICATIONS

European Search eport for EP Patent Application No. 12008621.0, European Patent Office, Munich, Germany, mailed on Sep. 17, 2013.
W. Chen et al. "A Novel Technique for Low-Cost Embedded Non-intrusive Fiber Monitoring of P2MP Optical Access Networks," Optical Fiber Communication (OFC 2007) Collocated National Fiber Optic Engineers Conference: Anaheim California, Mar. 25-29, 2007, IEEE Service Center, Piscataway, NJ, Mar. 1, 2007, pp. 1-3.
Office Action directed to related Taiwanese Application No. 101146375, dated Aug. 26, 2014, 5 pages.

* cited by examiner

*Primary Examiner* — Hanh Phan
(74) *Attorney, Agent, or Firm* — Sterne, Kessler, Goldstein & Fox P.L.L.C.

(57) ABSTRACT

In a first aspect, the method and apparatus of the present disclosure can be used to periodically and/or intermittently place one or more ONUs attached to a PON in a power savings mode so that an OTDR test can be performed. While in the power savings mode, the ONUs temporarily suspend their transmitter function and power down their upstream lasers. In a second aspect, the method and apparatus of the present disclosure can be used to coordinate the performance of OTDR during one or more periodic or intermittent discovery slots used to detect and register ONUs recently connected to the PON. Because new ONUs are infrequently connected to the PON and ONUs already registered are not permitted to transmit during the discovery windows, OTDR can be performed during these windows without impacting, to a great degree, the normal operation of the PON.

21 Claims, 5 Drawing Sheets

PASSIVE OPTICAL FIBER PLANT ANALYSIS

FIELD OF THE INVENTION

This application relates generally to the analysis of optical fiber plants and, more particularly to the analysis of passive optical fiber plants using optical time-domain reflectometry (OTDR).

BACKGROUND

To keep pace with increasing voice, data, and video traffic, network operators have, in many areas, upgraded existing access networks by deploying optical fibers deeper into the last mile to shorten the lengths of existing copper and coaxial networks. Among different competing optical network technologies, passive optical networks (PONs) have been one of the favored choices for these next-generation access networks. With the large bandwidth of optical fibers, PONs can accommodate bandwidth-intensive voice, data, and video services.

However, the large bandwidth of PONs has increased the need to provide a high-level of network reliability. For example, because PONs have the potential to transport large amounts of data, a single faulty optical connector or fiber can interrupt a vast number of services running over the network. Therefore, network reliability is an exceedingly important issue to PON operators.

Resolving interruptions in a PON involves locating and identifying the source of the interruption. Optical time-domain reflectometry (OTDR) is often used in this capacity to locate and, potentially, identify sources of interruption, such as a fault or break in an optical fiber. OTDR is an optical measurement technique that is used to analyze the attenuation in an optical fiber (i.e., light loss). The technique specifically involves injecting a short laser pulse into an optical fiber plant and measuring the backscatter and reflection of light as a function of time. The backscattered and reflected light characteristics can then be analyzed to determine the location, for example, of any optical fiber fault/break or splice loss.

Although OTDR equipment can be used to locate and, potentially, identify sources of interruption in a PON, the effectiveness of these devices is often inhibited by noise from other devices on the PON. For example, optical network units (ONUs) attached to the PON leak optical power even when they are not transmitting. This leaking noise creates noise that can affect the quality of OTDR measurements. In addition, the use of OTDR equipment often itself creates and/or necessitates interruptions in the operation of PONs.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The embodiments of the present disclosure will be described with reference to the accompanying drawings. The drawing in which an element first appears is typically indicated by the leftmost digit(s) in the corresponding reference number.

DETAILED DESCRIPTION

Figure 1:
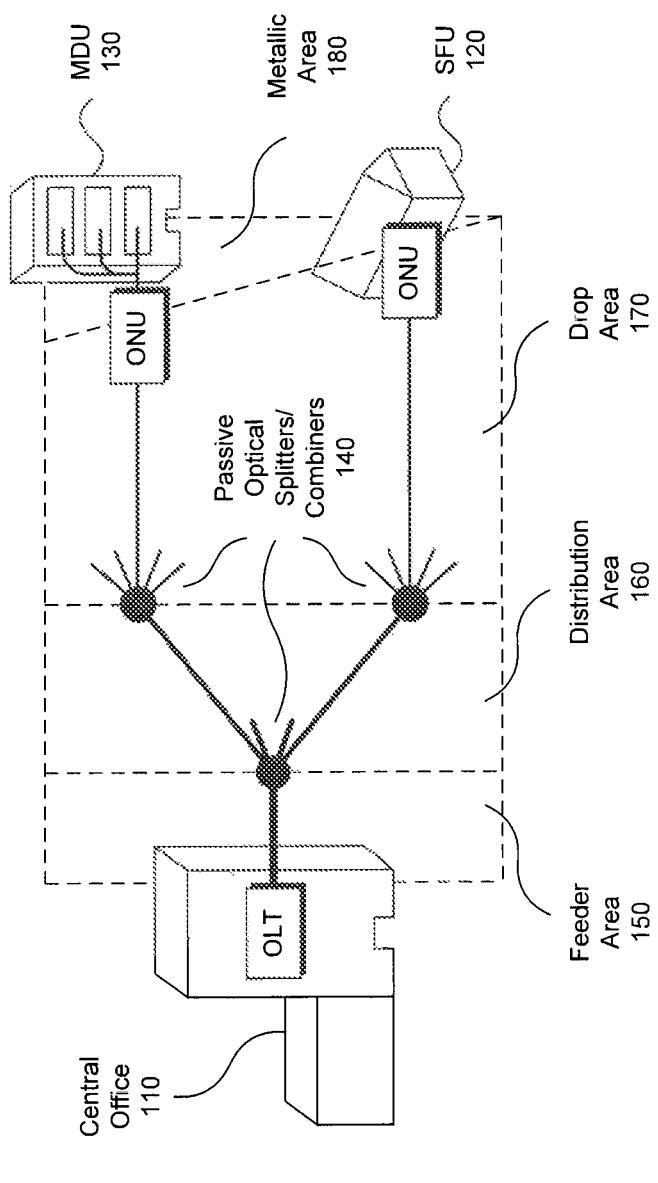
FIG. 1 illustrates an exemplary PON in accordance with embodiments of the present disclosure.

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

I. Overview

The present disclosure is directed to a method and apparatus for improving the quality of OTDR measurements in a PON and/or the impact of performing these measurements on the normal operation of the PON.

As briefly mentioned above, PONS can include many attached devices, such as ONUs, that leak optical power onto the PON even when they are not actively transmitting. The noise introduced onto the PON by these leaky devices can negatively impact the quality of measurements taken by OTDR equipment. Therefore, in a first aspect, the method and apparatus of the present disclosure can be used to periodically or intermittently place one or more of the ONUs attached to the PON in a power savings mode so that OTDR can be performed.

In general, power savings modes are specified in many of the PON standards, such as the ITU-T gigabit passive optical network (GPON) standard and the IEEE service interoperability in Ethernet passive optical networks (SIEPON) standard. While in the power savings mode, the ONUs temporarily suspend their transmitter function and power down their upstream lasers. This reduces the optical power leaked onto the PON from those devices. Importantly, ONUs are not deregistered from the PON as a result of being placed into the power savings mode, which helps to reduce the overall impact of placing the ONUs in a power savings mode to perform OTDR on the normal operation of the PON.

In a second aspect, the method and apparatus of the present disclosure can be used to coordinate the performance of OTDR during one or more periodic or intermittent discovery slots used to detect and register ONUs recently connected to the PON. Because new ONUs are infrequently connected to the PON and ONUs already registered are not permitted to transmit during the discovery slot, OTDR can be performed during these slots without impacting, to a great degree, the normal operation of the PON.

The following sections describe these and other aspects of the present disclosure.

II. Exemplary Operating Environment

FIG. 1 illustrates an exemplary PON 100 in which embodiments of the present disclosure can be implemented. As depicted in FIG. 1, PON 100 communicatively couples a central office 110 to a single family unit (SFU) 120 and a multi-dwelling unit (MDU) 130 (i.e., a structure housing two or more residential or business units). Transmissions within PON 100 are specifically performed between an optical line terminal (OLT) at central office 110 and optical network units (ONUs) at SFU 120 and MDU 130 over optical fibers that span the distance between them. The OLT at central office 110 couples PON 100 at its end to a service network (not shown), which can be a metropolitan area network or a core network, for example. In addition, the ONUs at SFU 120 and MDU 130 further couple PON 100 at their ends to home or business networks (also not shown).

The overall network structure shown in FIG. 1 allows end user devices coupled to the home or business networks within SFU 120 and MDU 130 to send data to, and receive data from, the service network over PON 100. Wavelength division multiplexing (WDM) can be used to send downstream traffic over one wavelength and upstream traffic over another wavelength. For example, many PON standards use the same basic wavelength plan: 1,490 nanometer (nm) wavelength for downstream traffic and 1,310 nm wavelength for upstream traffic. 1,550 nm wavelength is also commonly used for optional overlay services, such as RF video.

As further shown in FIG. 1, the portion of PON 100 closest to central office 110 is commonly referred to as the feeder area 150. This area includes one or more feeder cables that each has multiple fibers. Passive optical splitters/combiners 140 are used to split the individual fibers of the feeder cables into multiple distribution fibers that fall within the second portion of PON 100, which is commonly referred to as the distribution area 160. The distribution fibers are then further split by additional passive optical splitters/combiners 140 into multiple drop fibers that extend to SFU 120 and MDU 130. The drop fibers fall within the third and final portion of PON 100, which is commonly referred to as the drop area 170.

In prior access networks, distribution area 160 and/or drop area 170 were deployed using copper and coaxial cables. By extending fiber cables deeper into the access network, all the way to the home, building, or curb, for example, PON 100 can accommodate bandwidth-intensive voice, data, and video services that these prior access networks could not handle. As illustrated in FIG. 1, the only remaining portion of the network between central office 110 and an end user's device at SFU 120 and MDU 130 that potentially is not optically connected is within the local area networks at these locations (i.e., within metallic area 180). Over such short copper and/or coaxial wiring distances, current local area network technology generally provides adequate bandwidth.

It should be noted that PON 100 illustrates only one exemplary PON and fiber distribution topology (i.e., a tree topology) in which embodiments of the present disclosure can be implemented. Other fiber distribution topologies in which embodiments of the present disclosure can be implemented include other point-to-multipoint topologies, ring topologies, and mesh topologies, for example.

During operation of the access network illustrated in FIG. 1, signals sent downstream over the three portions of PON 100 by the OLT at central office 110 are split by passive optical splitters/combiners 140 and are received by the ONUs at SFU 120 and MDU 130. The signals sent downstream are therefore broadcasted to all ONUs. Conversely, signals sent upstream over the three portions of PON 100 by the ONUs at SFU 120 and MDU 130 are combined by passive optical splitters/combiners 140 and are received by the OLT at central office 110.

To prevent collisions in the upstream direction and to share the upstream capacity of PON 100 fairly, the OLT at central office 110 and the ONUs at SFU 120 and MDU 130 implement some form of arbitration mechanism. For example, many PONs implement a non-contention based media access scheme that grants each ONU access to the shared medium for a limited interval of time for transmitting data upstream. This limited interval of time is commonly referred to as a time slot.

Figure 2:
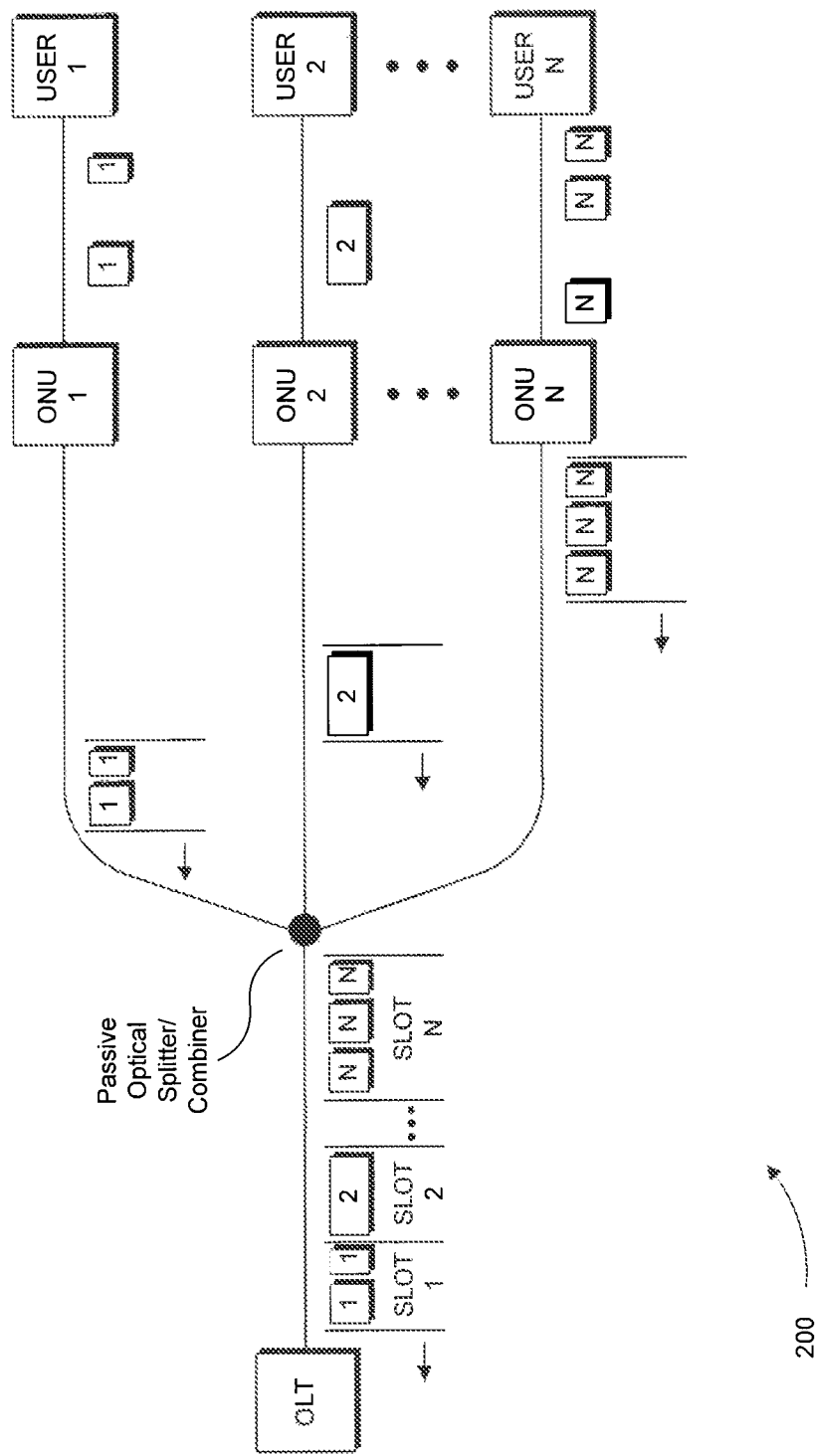
FIG. 2 illustrates data being sent upstream over a PON in accordance with a non-contention based media access scheme in accordance with embodiments of the present disclosure.

FIG. 2 illustrates an example of data being sent upstream over a PON in accordance with such a non-contention based media access scheme. In FIG. 2, each ONU 1 through N is synchronized to a common time reference and is allocated a timeslot for transmitting one or more packets of data upstream to the OLT. More specifically, each ONU 1 through N buffers packets received from an attached end user (or users) and bursts one or more of the buffered packets upstream to the OLT when its assigned timeslot arrives. For example, ONU 1 receives two packets of data from attached user 1, buffers the two packets of data, and bursts the two packets upstream during a first timeslot assigned to ONU 1. ONU 2 receives a single packet of data from attached user 2, buffers the packet of data, and bursts the single packet upstream during a second timeslot assigned to ONU 2. As can be seen from FIG. 2, the time slots are assigned to the ONUs such that they do not overlap in time, thereby preventing upstream collisions.

Beyond simply assigning time slots such that they do not overlap in time, the exact method of when and how much capacity is granted to a particular ONU in such a non-contention based media access scheme can greatly affect the performance of the PON. In most PONs, each ONU is dynamically assigned time slots of varying capacities based on the instantaneous amount of data buffered by the ONUs (i.e., in accordance with a dynamic bandwidth allocation (DBA) scheme).

In a PON implementing a DBA scheme, the OLT is responsible for allocating upstream grants (or timeslots) to each ONU. An ONU defers its upstream transmissions until it receives a grant from the OLT. In order to receive a grant, an ONU generates and transmits an upstream message to the OLT called a REPORT message that informs the OLT of its respective upstream queue status. The OLT uses this information sent from each ONU requesting upstream bandwidth to generate and transmit GATE messages to those ONUs. Each GATE message generally allocates an upstream transmission grant to an ONU based on, for example, its upstream bandwidth needs and the upstream bandwidth needs of the other ONUs.

However, because ONUs are located at different distances from the OLT, the signals sent upstream from each ONU will take different amounts of time, due to fiber delay, before reaching the OLT. Therefore, it is important to establish a common timing reference between the OLT and the ONUs to account for the different fiber delays so that, when an ONU signal arrives at the OLT, it arrives at or very near the moment the OLT intended to receive the signal. This prevents collisions in the upstream direction. The timing reference between the OLT and the ONUs can be established through a process called ranging, which is typically performed during a discovery process.

The discovery process is used by an OLT to detect and register ONUs that have been recently connected to the PON by learning their respective round-trip delays and MAC addresses. To perform the discovery process, the OLT periodically or intermittently transmits a discovery GATE message to the ONUs that includes a timestamp of the local time of the OLT and the start time of a discovery slot.

Un-registered ONUs can respond to the discovery GATE message by setting their local-time (as determined by their local clocks) to the timestamp included in the discovery GATE message. When the local clock of an un-registered ONU reaches the start time of the discovery slot (also included in the discovery GATE message), the ONU can transmit REGISTER_REQUEST message. The REGISTER_ REQUEST message can include the ONU's MAC address and a timestamp representing the ONU's local time when the REGISTER_REQUEST message was sent.

When the OLT receives the REGISTER_REQUEST message from the ONU, it can learn the MAC address of the ONU and the round-trip time (RTT) of the ONU. The RTT can be specifically calculated as the difference between the time the REGISTER_REQUEST message is received at the OLT and the timestamp included in the REGISTER_REQUEST message. The RTT time can be stored for each registered ONU and can be used to adjust the time that data frames from an ONU are to be transmitted (as instructed by the OLT). Because more than one un-registered ONU can respond during a discovery slot, collisions may occur. However, often no collision occurs. In fact, in many instances, no ONU responds to a discovery slot.

Figure 3:
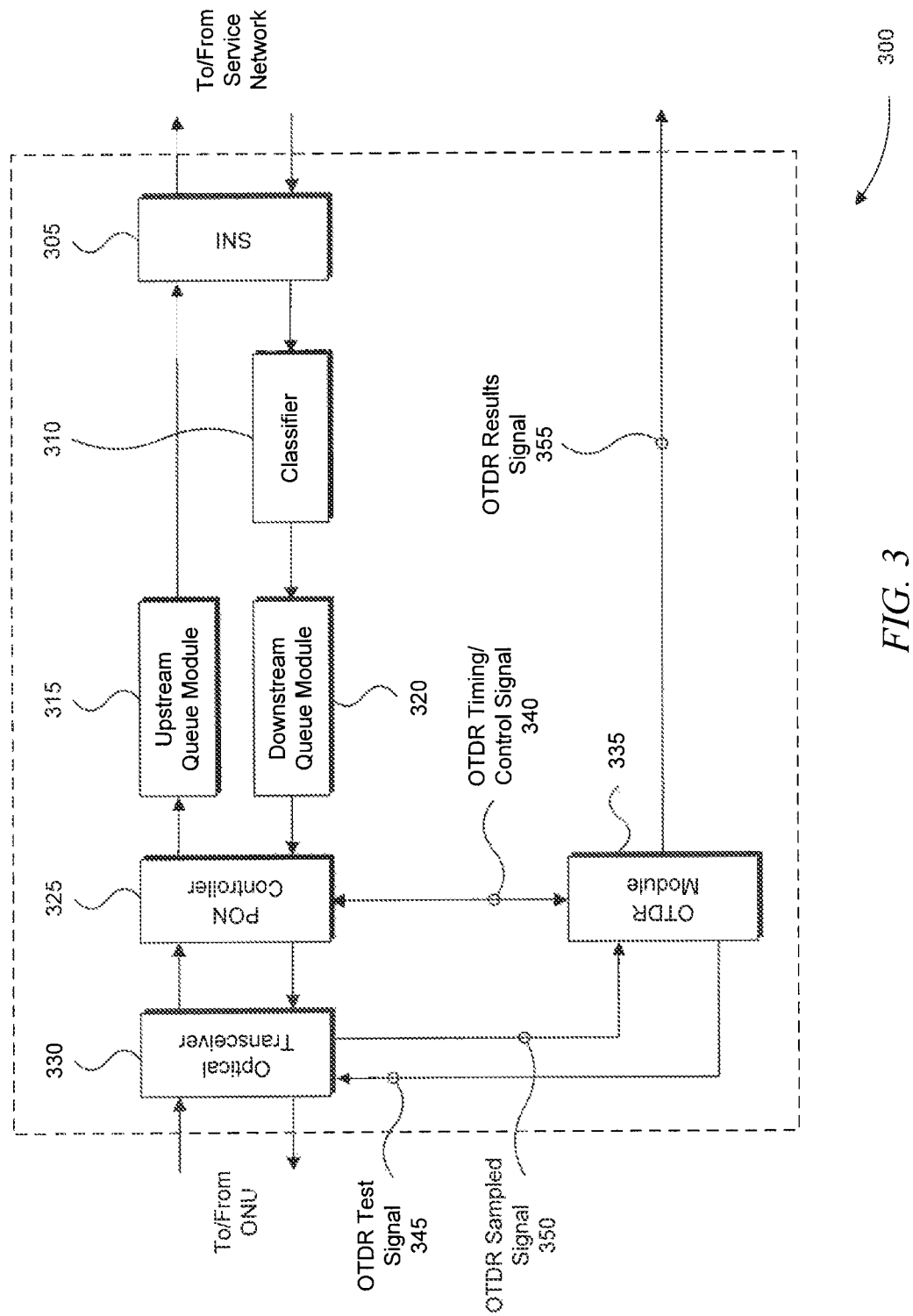
FIG. 3 illustrates an exemplary block diagram of an OLT in accordance with embodiments of the present disclosure.

Referring now to FIG. 3, an exemplary, high-level block diagram of an OLT 300 in which embodiments of the present disclosure can be implemented is illustrated. OLT 300 includes a service network interface (SNI) 305, an optional classifier 310, an upstream queue module 315, a downstream queue module 320, a PON controller 325, an optical transceiver 330, and an optical time-domain reflectometry (OTDR) module 335 for performing OTDR.

In the upstream direction, optical transceiver 330 receives an optical signal transmitted from an ONU over a PON. Data in the form of packets are recovered from the optical signal and are provided to PON controller 325 in an electrical format. PON controller 325 accepts and analyzes the packets and, depending on the content of the packets, potentially passes them on to upstream queue module 315 for buffering. The packets buffered in upstream queue module 315 are subsequently transmitted to the service network via SNI 305.

In the downstream direction, packets of data to be transmitted to ONUs over the PON are initially received from the service network via SNI 305. Classifier 310 (optionally included in OLT 300) classifies the packets into a priority class based on the type of content the packets are carrying. For example, packets carrying voice or video data can be classified into a priority class characterized by small transmission delays (e.g., a high priority class), whereas packets carrying data other than voice or video can be classified into a priority class characterized by requiring only best effort transmission (e.g., a low priority class).

Assuming that classifier 310 is included in OLT 300, downstream queue module 320 can include a plurality of downstream queues, each with a designated priority level. Classifier 310 can insert a packet received from the service network via SNI 305 into one of the plurality of downstream queues with a designated priority corresponding to the packet's priority classification. Once removed from a downstream queue, the packets and generally sent downstream over the PON coupled to OLT 300 by PON controller 325 and optical transceiver 330.

As mentioned briefly above, the channel capacity of a PON, such as the PON coupled to OLT 300, is typically shared by multiple ONUs in the upstream direction. As a result, upstream transmissions from each ONU attached to the PON are arbitrated to avoid collisions. OLT 300 is configured to perform this arbitration by allocating grants (also called time slots) to the ONUs. In this scheme, an ONU defers upstream data transmissions until it receives a grant from OLT 300. In order to receive a grant, an ONU generates and transmits an upstream message to OLT 300 called a REPORT message that informs OLT 300 of the respective status of its upstream queues. OLT 300 can use this information sent from one or more of the ONUs requesting upstream bandwidth to generate and transmit GATE messages to those ONUs. Each GATE message generally allocates an upstream transmission grant to an ONU based on, for example, its upstream bandwidth needs and the upstream bandwidth needs of the other ONUs.

In OLT 300, PON controller 325 can be configured to process received REPORT messages and generate appropriate GATE messages in response. In addition, PON controller 325 can be further configured to perform the discovery process described above, which is used to detect and register ONUs that have been recently connected to the PON by learning their respective round-trip delays and MAC addresses.

III. First Aspect of the Present Disclosure

In a first aspect, the present disclosure is directed to a method and apparatus for periodically and/or intermittently placing one or more of the ONUs attached to a PON in a power savings mode so that OTDR can be performed. This first aspect is described below with reference to exemplary OLT 300 illustrated in FIG. 3. However, it should be noted that the method and apparatus of the present disclosure can be implemented in other OLTs as will be appreciated by one of ordinary skill in the art.

In general, a PON can include many attached devices, such as ONUs, that leak optical power onto the PON even when they are not actively transmitting. The noise introduced onto the PON by these leaky devices can negatively impact the quality of measurements analyzed by OTDR module 335 illustrated in FIG. 3. For example, because OTDR involves measuring very weakly powered backscatter and reflection of light received over an optical fiber, any extra noise on the optical fiber can affect the quality of the results returned from analyzing the measured backscattered and reflected light.

Therefore, OTDR module 335 can periodically and/or intermittently place one or more of the ONUs attached to the PON in which OLT 300 operates in a power savings mode so that OTDR can be performed. In general, power savings modes are specified in many PON standards, such as the ITU-T GPON standard and the IEEE SIEPON standard. While in a power savings mode, ONUs temporarily suspend their transmitter function and power down their upstream lasers. This reduces the optical power leaked onto the PON from those devices. Importantly, ONUs are typically not deregistered as a result of being placed into a power savings mode, which helps to reduce the overall impact of placing the ONUs in a power savings mode to perform OTDR on the normal operation of the PON.

OTDR module 335 can signal to PON controller 325 via OTDR timing/control signal 340 to send a command to one or more ONUs to temporarily enter a power savings mode by suspending their transmitter function and powering down their upstream laser. For example, in a PON configured to operate in accordance with the SIEPON standard, the PON controller 325 can send a power-saving initiation command, often referred to as SLEEP ALLOW, to the one or more ONUs. In response, the one or more ONUs can send back a message, often referred to as SLEEP ACK, when they accept the power-saving initiation command. Once PON controller 325 receives the SLEEP ACK message (or some equivalent message) from all or some number of the one or more ONUs, the PON controller 325 can signal to OTDR module 335 via OTDR timing/control signal 340 to begin the OTDR test.

OTDR module 335 can begin the OTDR test by sending a pulse or pattern of pulses to the optical transceiver 330 via OTDR test signal 345. Optical transceiver 330 can then inject the pulse or pattern of pulses into the PON. The pulses can be injected at the same wavelength used for normal downstream traffic (e.g. 1,490 nm or 1,550 nm wavelength), upstream traffic (e.g., 1310 nm wavelength), or some other out-of-band wavelength, for example.

Optical transceiver 330 can further sample the resulting backscatter and reflection of light from the injected pulse or pattern of pulses. The sampled backscatter and reflection of light can be passed to OTDR module 335 for analysis, as a function of time, to locate and, potentially, identify sources of interruption, such as a dirty/damaged/misaligned connector or splitter or a break/macrobend in an optical fiber. The results of this analysis can be provided as output from OLT 300 via OTDR results signal 355.

Once the backscatter and reflection of light is sampled, the PON controller 325 can optionally send a command to the one or more ONUs to terminate the power savings mode. OTDR module 335 can signal to PON controller 325 via OTDR timing/control signal 340 when such a termination command can be sent.

It should be noted that in other embodiments, the one or more ONUs can be simply forced to power-down or reset by OLT 300 such that their lasers are disabled. However, this may have the negative impact of deregistering the ONUs from the PON, which may affect service to a greater degree.

Figure 4:
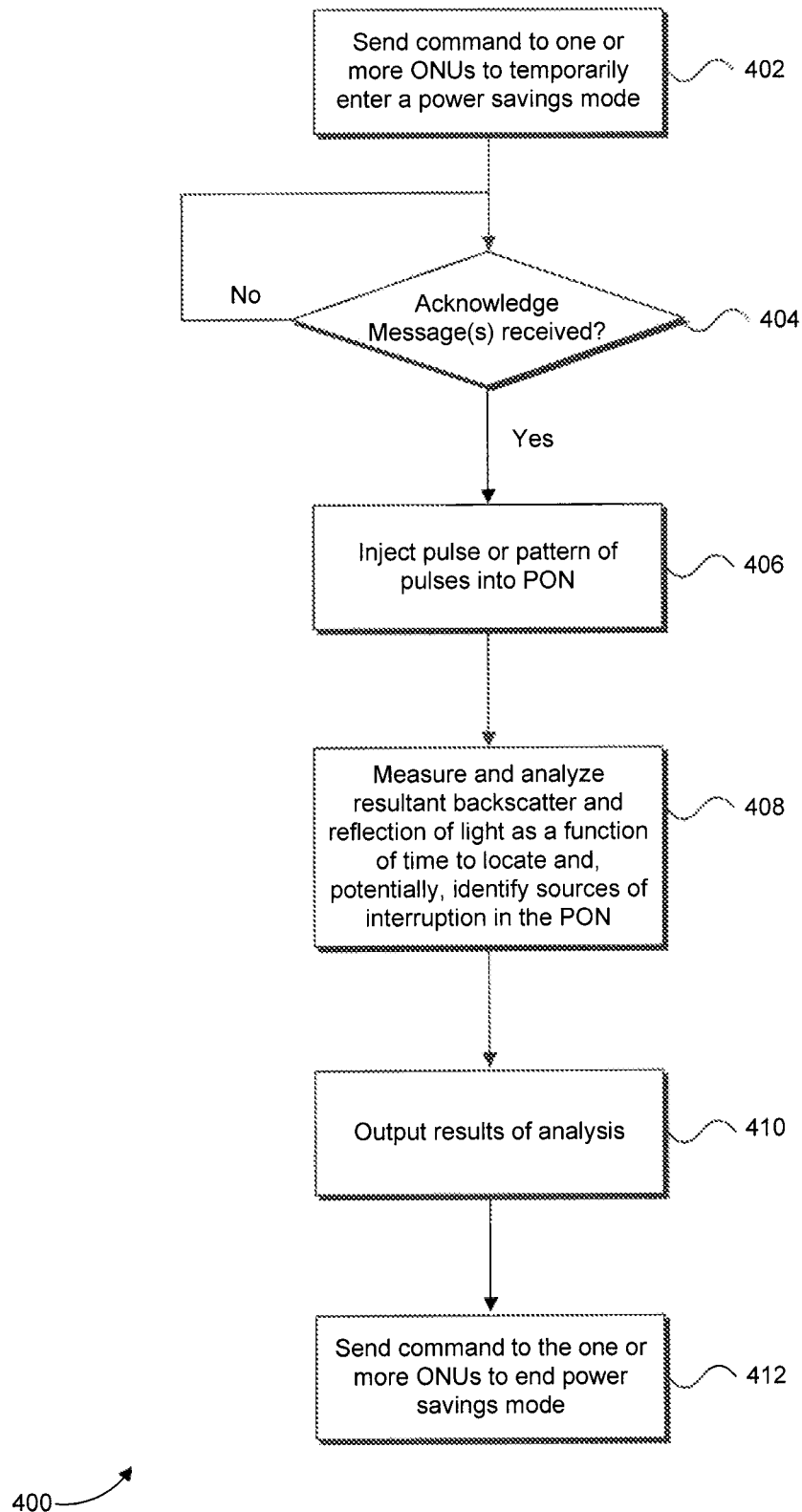
FIG. 4 illustrates a flowchart of a method for periodically and/or intermittently placing one or more ONUs attached to a PON in a power savings mode so that OTDR can be performed in accordance with embodiments of the present disclosure.

FIG. 4 illustrates a flowchart 400 of a method for periodically and/or intermittently placing one or more ONUs attached to a PON in a power savings mode so that OTDR can be performed in accordance with embodiments of the present disclosure. The method of flowchart 400 can be implemented by OLT 300 illustrated in FIG. 3. However, it should be noted that the method can be implemented by other systems and components as well. It should be further noted that some of the steps of flowchart 400 do not have to occur in the order shown in FIG. 4.

The method of flowchart 400 begins at step 402. At step 402, a command is sent to one or more ONUs on a PON to instruct them to temporarily enter a power savings mode. For example, in a PON configured to operate in accordance with the SIEPON standard, a power-saving initiation command, often referred to as SLEEP ALLOW, can be sent to the one or more ONUs to instruct them to temporarily enter a power savings mode.

During decision step 404, a determination is made as to whether a sleep acknowledgment message (or some equivalent message) has been received from all or some number of the one or more ONUs. If a sleep acknowledgment message (or some equivalent message) has been received from all or some number of the one or more ONUs, the flowchart 400 proceeds to step 406. Otherwise, the flowchart 400 remains in step 404.

At step 406, an OTDR test is initiated and a pulse or pattern of pulses is injected into the PON. The pulses can be injected at the same wavelength used for normal downstream traffic (e.g. 1,490 nm or 1,550 nm wavelength), the same wavelength used for upstream traffic (e.g., 1310 nm wavelength), or some other out-of-band wavelength, for example.

At step 408, the backscatter and reflection of light resulting from the injected pulse or pattern of pulses can be measured and analyzed as a function of time to locate and, potentially, identify sources of interruption, such as a dirty/damaged/misaligned connector or splitter or a break/macrobend in an optical fiber.

At step 410, the result of the analysis can be output. For example, the analysis can be output to a display or file for storage.

At step 412, a command can be sent to the one or more ONUs to terminate the power savings mode.

IV. Second Aspect of the Present Disclosure

In a second aspect, the present disclosure is directed to a method and apparatus for coordinating the performance of OTDR tests during one or more periodic or intermittent discovery slots of the discovery process performed in a PON. This second aspect is described below with reference to exemplary OLT 300 illustrated in FIG. 3. However, it should be noted that the method and apparatus of the present disclosure can be implemented in other OLTs as will be appreciated by one of ordinary skill in the art.

As described above, the discovery process is used to detect and register ONUs that have been recently connected to the PON by learning their respective round-trip delays and MAC addresses. To perform the discovery process, the PON controller 325 of OLT 300 periodically or intermittently transmits a discovery GATE message to the ONUs that includes a timestamp of the local time of OLT 300 and the start time of a discovery slot.

Un-registered ONUs can respond to the discovery GATE message by setting their local-time (as determined by their local clocks) to the timestamp included in the discovery GATE message. When the local clock of an un-registered ONU reaches the start time of the discovery slot (also included in the discovery GATE message), the ONU can transmit a REGISTER_REQUEST message. The REGISTER_REQUEST message can include the ONU's MAC address and a timestamp representing the ONU's local time when the REGISTER_REQUEST message was sent.

When OLT 300 receives the REGISTER_REQUEST message from the ONU, it can learn the MAC address of the ONU and the round-trip time (RTT) of the ONU. The RTT can be specifically calculated as the difference between the time the REPORT message is received at OLT 300 and the timestamp included in the REPORT message. The RTT can be stored for each registered ONU and can be used to adjust the time that data frames from an ONU are to be transmitted (as instructed by the OLT).

Because more than one un-registered ONU can respond to a discovery slot, collisions may occur. However, often no collision occurs. In fact, in many instances, no ONU responds to a discovery slot. Thus, OTDR module 335 can take advantage of these periods of time when potentially no device is transmitting over the PON to perform an OTDR test. This helps to reduce the impact of performing an OTDR test on the normal operation of the PON.

For example, and in one embodiment, OTDR module 335 can receive an indication from PON controller 325 via OTDR timing/control signal 340 of the occurrence of a discovery slot. OTDR module 335 can then begin an OTDR test by sending a pulse or pattern of pulses to the optical transceiver 330 via OTDR test signal 345. Optical transceiver 330 can then inject the pulse or pattern of pulses into the PON. The pulses can be injected at the same wavelength used for normal downstream traffic (e.g. 1,490 nm or 1,550 nm wavelength), the same wavelength used for upstream traffic (e.g., 1,310 nm wavelength), or some other out-of-band wavelength, for example.

Optical transceiver 330 can further sample the resulting backscatter and reflection of light from the injected pulse or pattern of pulses. The sampled backscatter and reflection of light can be passed to OTDR module 335 for analysis, as a function of time, to locate and, potentially, identify sources of interruption, such as a dirty/damaged/misaligned connector or splitter or a break/macrobend in an optical fiber. The results of this analysis can be provided as output from OLT 300 via OTDR results signal 355.

In the event that an un-registered ONU attempts to register during the discovery slot, the sampled backscatter and reflection of light will appear corrupted and can simply be discard by OTDR module 335.

It should be noted that an OTDR test can require a large number of samples to average out noise. Therefore, in order to achieve results in a rapid manner, the rate at which discovery slots are made available to the PON can be increased by PON controller 325. For example, in many PONs, discovery slots are typically made available around once per second. This typical rate can be increased (e.g., to 1000 discovery slots per second) to obtain OTDR test results in a more rapid manner.

It should be further noted that this second aspect of the present disclosure can be used in conjunction with the first aspect of the present disclosure described above in the previous section. For example, one or more ONUs can be placed into a power savings mode and, after all or some number of the one or more ONUs are in the power savings mode, an OTDR test can be performed by OTDR module 335 during a discovery slot.

V. Additional Aspects of the Present Disclosure

In a further aspect, the method and apparatus of the present disclosure can use a measured RTT for an ONU on the PON to associate the ONU with a particular reflectance value measured by OTDR module 335. As discussed above, after a pulse or patterns of pulses is injected into the PON during an OTDR test, optical transceiver 330 can sample the resulting backscatter and reflection of light. The sampled backscatter and reflection of light can be passed to OTDR module 335 for analysis. More specifically, OTDR module 335 can analyze the samples as a function of time. Because the RTT associated with ONUs are measured when they are registered with the PON as discussed above, one or more of the registered ONUs can be further plotted against, or associated with, the samples based on their respective RTT to help interpret the results of the OTDR test.

In yet another aspect, the method and apparatus of the present disclosure can perform an admittance test (as opposed to a reflectance test). In this instance, the admittance is measured by having a selected ONU inject a pulse or pattern of pulses into the PON and measuring the admittance of the pulse or pattern of pulses at OLT 300. This has the advantage of allowing a single upstream path from the selected ONU to OLT 300 to be analyzed. In one embodiment, a pulse or pattern of pulses can be scheduled to be transmitted from the selected ONU. For example, the pulse or pattern of pulses can be schedule by OLT 300 to be injected into the PON by the selected ONU during a discovery slot used during the discovery process.

VI. Example Computer System Implementation

It will be apparent to persons skilled in the relevant art(s) that various elements and features of the present invention, as described herein, can be implemented in hardware using analog and/or digital circuits, in software, through the execution of instructions by one or more general purpose or special-purpose processors, or as a combination of hardware and software.

Figure 5:
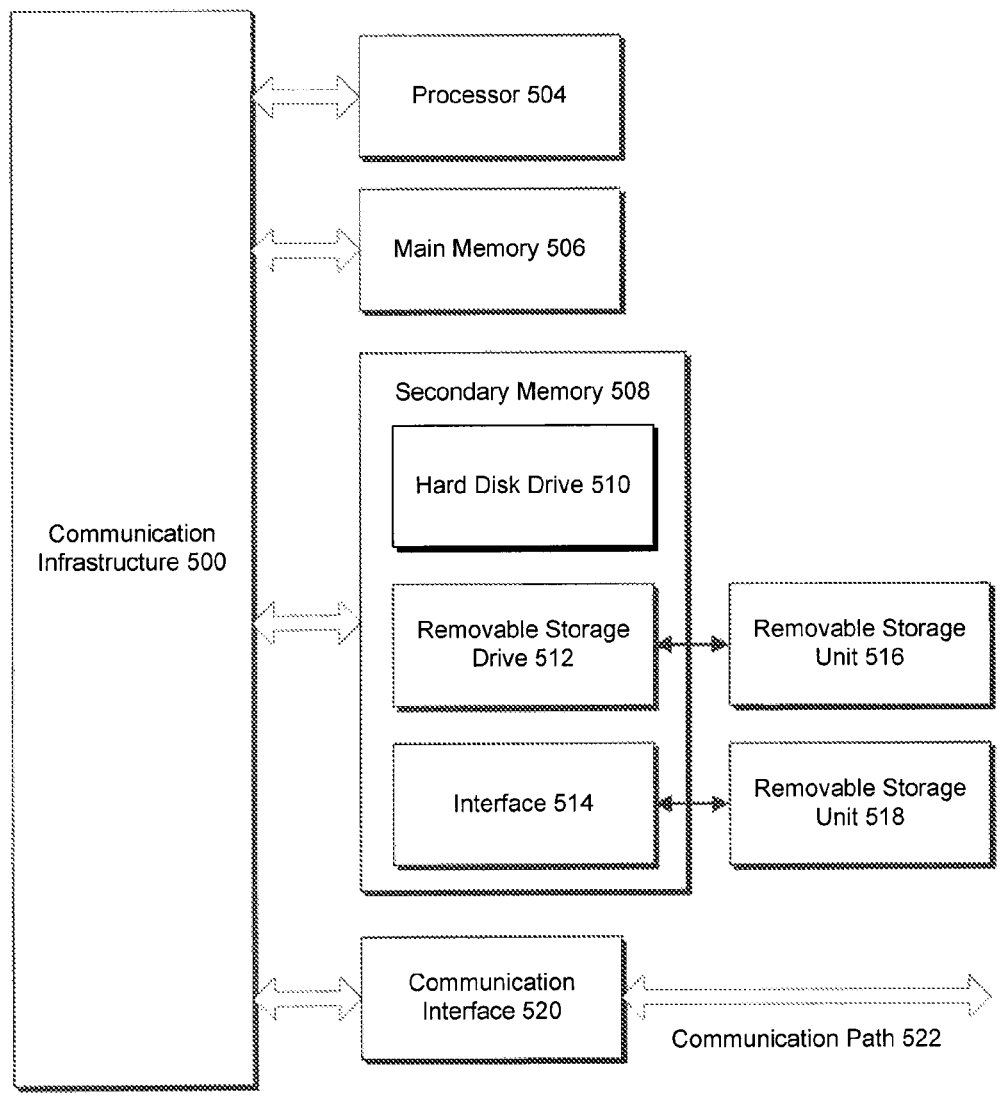
FIG. 5 illustrates an example computer system that can be used to implement aspects of the present disclosure.

The following description of a general purpose computer system is provided for the sake of completeness. Embodiments of the present invention can be implemented in hardware, or as a combination of software and hardware. Consequently, embodiments of the invention may be implemented in the environment of a computer system or other processing system. An example of such a computer system 500 is shown in FIG. 5. One or more of the modules depicted in FIG. 3, for example, can execute on one or more distinct computer systems 500. Furthermore, each of the steps of the flowchart depicted in FIG. 4 can be implemented on one or more distinct computer systems 500.

Computer system 500 includes one or more processors, such as processor 504. Processor 504 can be a special purpose or a general purpose digital signal processor. Processor 504 is connected to a communication infrastructure 502 (for example, a bus or network). Various software implementations are described in terms of this exemplary computer system. After reading this description, it will become apparent to a person skilled in the relevant art(s) how to implement the invention using other computer systems and/or computer architectures.

Computer system 500 also includes a main memory 506, preferably random access memory (RAM), and may also include a secondary memory 508. Secondary memory 508 may include, for example, a hard disk drive 510 and/or a removable storage drive 512, representing a floppy disk drive, a magnetic tape drive, an optical disk drive, or the like. Removable storage drive 512 reads from and/or writes to a removable storage unit 516 in a well-known manner. Removable storage unit 516 represents a floppy disk, magnetic tape, optical disk, or the like, which is read by and written to by removable storage drive 512. As will be appreciated by persons skilled in the relevant art(s), removable storage unit 516 includes a computer usable storage medium having stored therein computer software and/or data.

In alternative implementations, secondary memory 508 may include other similar means for allowing computer programs or other instructions to be loaded into computer system 500. Such means may include, for example, a removable storage unit 518 and an interface 514. Examples of such means may include a program cartridge and cartridge interface (such as that found in video game devices), a removable memory chip (such as an EPROM, or PROM) and associated socket, a thumb drive and USB port, and other removable storage units 518 and interfaces 514 which allow software and data to be transferred from removable storage unit 518 to computer system 500.

Computer system 500 may also include a communications interface 520. Communications interface 520 allows software and data to be transferred between computer system 500 and external devices. Examples of communications interface 520 may include a modem, a network interface (such as an Ethernet card), a communications port, a PCMCIA slot and card, etc. Software and data transferred via communications interface 520 are in the form of signals which may be electronic, electromagnetic, optical, or other signals capable of being received by communications interface 520. These signals are provided to communications interface 520 via a communications path 522. Communications path 522 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 516 and 518 or a hard disk installed in hard disk drive 510. These computer program products are means for providing software to computer system 500.

Computer programs (also called computer control logic) are stored in main memory 506 and/or secondary memory 508. Computer programs may also be received via communications interface 520. Such computer programs, when executed, enable the computer system 500 to implement the present invention as discussed herein. In particular, the computer programs, when executed, enable processor 504 to implement the processes of the present invention, such as any of the methods described herein. Accordingly, such computer programs represent controllers of the computer system 500. Where the invention is implemented using software, the software may be stored in a computer program product and loaded into computer system 500 using removable storage drive 512, interface 514, or communications interface 520.

In another embodiment, features of the invention are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

VII. Conclusion

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

What is claimed is:

1. An optical line terminal (OLT) configured to perform optical time-domain reflectometry (OTDR) to locate an interruption in a passive optical network (PON), the OLT comprising:
   a PON controller configured to transmit a power-saving initiation command to an optical network unit (ONU) over the PON to place the ONU in a power savings mode; and
   an OTDR module configured to inject a pulse into the PON and analyze a signal reflected back over the PON from the injected pulse to locate the interruption in the PON, wherein the OTDR module injects the pulse into the PON after receiving an indication that the ONU has accepted the power-saving initiation command and is in the power savings mode.

2. The OLT of claim 1, wherein the OTDR module is further configured to analyze the reflected signal to identify the source of interruption in the PON.

3. The OLT of claim 1, wherein the source of interruption is at least one of a faulty connector, a faulty splitter, and a break or macrobend in an optical fiber.

4. The OLT of claim 1, wherein the PON controller is further configured to receive an acknowledgment message from the ONU indicating that the ONU has accepted the power-saving initiation command.

5. The OLT of claim 1, wherein an upstream laser of the ONU is powered down while the ONU is in the power savings mode to reduce optical power leaked onto the PON.

6. The OLT of claim 1, wherein the ONU remains registered with the PON while in the power savings mode and after terminating the power savings mode.

7. The OLT of claim 1, further comprising:
   an optical transceiver configured to inject the pulse into the PON at the direction of the OTDR module.

8. The OLT of claim 7, wherein the pulse is injected into the PON by the optical transceiver at a wavelength of 1,490 nanometers (nm), 1,550 nm, 1650 nm, or 1310 nm.

9. The OLT of claim 1, wherein the PON controller is further configured to transmit a termination command to the ONU over the PON to terminate the power savings mode at the ONU.

10. The OLT of claim 1, wherein the PON controller is further configured to provide an indication to the OTDR module as to when a discovery slot is to occur.

11. The OLT of claim 10, wherein the OTDR module injects the pulse into the PON based on the indication such that the pulse is injected into the PON during the discovery slot.

12. The OLT of claim 11, wherein the discovery slot is used to detect ONUs newly connected to the PON.

13. An optical line terminal (OLT) configured to perform optical time-domain reflectometry (OTDR) to locate an interruption in a passive optical network (PON), the OLT comprising:
   an OTDR module configured to inject a pulse into the PON and analyze a signal reflected back over the PON from the injected pulse to locate the interruption in the PON; and
   a PON controller configured to provide an indication to the OTDR module as to when a discovery slot is to occur,
   wherein the OTDR module injects the pulse into the PON based on the indication such that the pulse is injected into the PON during the discovery slot, and
   wherein the discovery slot is used to detect optical network units (ONUS) newly connected to the PON.

14. The OLT of claim 13, wherein the PON controller is further configured to transmit a discovery GATE message over the PON that includes a start time of the discovery slot.

15. The OLT of claim 13, wherein the OTDR module is further configured to discard results obtained from analyzing the reflected signal from the injected pulse if an ONU responds to the discovery slot.

16. The OLT of claim 13, further comprising:
   an optical transceiver configured to inject the pulse into the PON at the direction of the OTDR module.

17. The OLT of claim 16, wherein the pulse is injected into the PON by the optical transceiver at a wavelength of 1.490 nanometers (nm), 1,550 nm, 1650 nm, or 1310 nm.

18. The OLT of claim 13, wherein the PON controller is further configured to transmit a power-saving initiation command to an ONU over the PON to place the ONU in a power savings mode.

19. The OLT of claim 18, wherein the OTDR module is further configured to inject the pulse into the PON after receiving an indication that the ONU has accepted the power-saving initiation command and is in the power savings mode.

20. The OLT of claim 13, wherein the OTDR module is further configured to use a round-trip time associated with an ONU to interpret results obtained from analyzing the reflected signal.

21. An apparatus comprising:
   an optical time-domain reflectometry (OTDR) module configured to inject a pulse into a passive optical network (PON) and analyze a signal reflected back over the PON from the injected pulse; and
   a PON controller configured to provide an indication to the OTDR module as to when a discovery slot is to occur,
   wherein the OTDR module is configured to inject the pulse into the PON based on the indication.

* * * * *

UNITED STATES PATENT AND TRADEMARK OFFICE
CERTIFICATE OF CORRECTION

| | | |
|---|---|---|
| PATENT NO. | : 8,913,887 B2 | Page 1 of 1 |
| APPLICATION NO. | : 13/483944 | |
| DATED | : December 16, 2014 | |
| INVENTOR(S) | : Hirth et al. | |

It is certified that error appears in the above-identified patent and that said Letters Patent is hereby corrected as shown below:

Title Page, Item (56), Foreign Patent Documents, please replace "IE   2 141 832 A1   1/2010" with --EP   2 141 832 A1   1/2010--.

Signed and Sealed this
Fourteenth Day of April, 2015

Michelle K. Lee
*Director of the United States Patent and Trademark Office*